United States Patent
Park et al.

(10) Patent No.: US 12,534,419 B2
(45) Date of Patent: Jan. 27, 2026

(54) ORGANIC FERTILIZER AND A METHOD FOR MANUFACTURING THE SAME

(71) Applicant: BSAC CO., INC., Gwangyang-si (KR)

(72) Inventors: Kwang Gi Park, Gwangyang-si (KR); Hoi Jun Park, Gwangyang-si (KR)

(73) Assignee: BSAC CO., INC., Gwangyang-si (KR)

( * ) Notice: Subject to any disclaimer, the term of this patent is extended or adjusted under 35 U.S.C. 154(b) by 752 days.

(21) Appl. No.: 17/801,851

(22) PCT Filed: Apr. 29, 2022

(86) PCT No.: PCT/KR2022/006144
§ 371 (c)(1),
(2) Date: Aug. 24, 2022

(87) PCT Pub. No.: WO2022/265219
PCT Pub. Date: Dec. 22, 2022

(65) Prior Publication Data
US 2024/0208879 A1     Jun. 27, 2024

(30) Foreign Application Priority Data

Jun. 14, 2021 (KR) .................. 10-2021-0076598

(51) Int. Cl.
*C05F 11/08* (2006.01)
*C05F 3/00* (2006.01)
*C05G 5/30* (2020.01)

(52) U.S. Cl.
CPC .............. *C05F 11/08* (2013.01); *C05F 3/00* (2013.01); *C05G 5/30* (2020.02)

(58) Field of Classification Search
CPC .............. C05F 11/08; C05F 3/00; C05G 5/30
See application file for complete search history.

(56) References Cited

U.S. PATENT DOCUMENTS

| | | | | |
|---|---|---|---|---|
| 12,414,568 | B2 * | 9/2025 | Pierce | A01N 63/27 |
| 2020/0148605 | A1 | 5/2020 | Burnham et al. | |
| 2023/0140837 | A9 | 5/2023 | Burnham et al. | |
| 2025/0257014 | A1 * | 8/2025 | Traxler | C10B 57/02 |

FOREIGN PATENT DOCUMENTS

| | | | | |
|---|---|---|---|---|
| CN | 109956824 A | * | 7/2019 | C05B 1/02 |
| CN | 106748133 B | * | 1/2021 | C05G 5/30 |
| CN | 106800435 B | * | 1/2021 | C05G 5/30 |
| CN | 112544360 A | * | 3/2021 | C05G 3/80 |
| EP | 0330941 A1 | * | 9/1989 | C05F 11/00 |
| KR | 10-2011-0077703 A | | 7/2011 | |
| KR | 10-2014-0019992 A | | 2/2014 | |
| KR | 10-2020-0007640 A | | 1/2020 | |
| KR | 102181044 B1 | * | 11/2020 | C05F 5/00 |
| WO | 2020/102420 A1 | | 5/2020 | |

* cited by examiner

*Primary Examiner* — Wayne A Langel
(74) *Attorney, Agent, or Firm* — Sughrue Mion, PLLC

(57) ABSTRACT

Disclosed is a microbial coated organic fertilizer comprising a coating layer formed on at least a part of the surface of an organic fertilizer comprising 60 to 80 parts by weight of castor meal and 1 to 15 parts by weight of rice bran, wherein the coating layer is formed by spraying a microbial culture medium, and drying and cooling the same, and a method for manufacturing the same.

8 Claims, 1 Drawing Sheet

(a) kneading and crushing castor meal and rice bran
(b) molding into an organic fertilizer in the form of a pellet or granule
(c) forming a coating layer by spraying a microbial culture medium on the organic fertilizer
(d) cooling and drying the organic fertilizer

ORGANIC FERTILIZER AND A METHOD FOR MANUFACTURING THE SAME

CROSS REFERENCE TO RELATED APPLICATIONS

This application is a National Stage of International Application No. PCT/KR2022/006144 filed Apr. 29, 2022, claiming priority based on Korean Patent Application No. 10-2021-0076598 filed Jun. 14, 2021.

TECHNICAL FIELD

The present invention relates to a microbial coated organic fertilizer with improved mechanical properties and quality, and a method for manufacturing the same.

BACKGROUND ART

Fertilizer refers to a generic term for nutrients which promote the growth of crops or vegetation by fertilizing fruit trees or forest soil, including fields, rice paddies, and soil. In general, fertilizers are defined as nutrients directly injected into soil or plants to promote the growth of crops or vegetation by maintaining or enhancing the productivity of the soil, or even if not directly injected, substances which indirectly help crop growth by improving the physicochemical properties of the soil, enhancing or inhibiting useful microorganisms, changing nutrients that exist in a form that cannot be directly used in plants into usable forms, or reducing the toxicity of substances toxic to the roots.

Higher plants absorb water and inorganic ingredients, which are nutrients, from their roots and use solar energy to synthesize various organic substances essential for growth by going through photosynthesis at their leaves. Native plants grow and die by absorbing nutrients in a predetermined area, and thus there is little loss of nutrients in the soil in the habitat, which allows native plants to grow relatively well. On the other hand, crops in farmland absorb nutrients from rhizosphere soil and have their harvest transported elsewhere once the growth is completed. Thus, the nutrients absorbed cannot be returned to the soil. Therefore, if the nutrients consumed while growing the crops are not artificially supplied in a timely manner, the productivity of crops may show a decreasing trend every year. Accordingly, in order to continuously maintain or increase the productivity of the land and maintain the productivity of crops, fertilization management is required according to the type of crops and the type of soil.

Accordingly, in order to increase the productivity of crops, chemical fertilizers (inorganic fertilizers) have been used since the 1960s. The use of an appropriate amount of chemical fertilizers may guarantee rapid growth of cultivated crops and increase in profits, but excessive fertilization may cause acidification of the cultivated soil and salt disturbance due to salt accumulation. Also, the soil ecosystem may be destroyed as the growth of microorganisms, the final decomposer, is inhibited, which may lead to degradation of the farmland.

In order to solve this problem, the use of organic fertilizers has been proposed instead of chemical fertilizers. Organic fertilizers are fermented with microorganisms and decomposed to provide nutrients for plants to use. When organic fertilizers are applied to the cultivated land, inorganic nutrients (N, P, K) and trace elements (Mg, Mn, Cu, B, Mo, etc.) are supplied as nutrients for cultivated crops to stimulate growth. In addition, amino acids, nucleic acids, organic acids, vitamins, etc. may be supplied allowing soil rhizosphere microorganisms to settle by providing physical pore voids in the soil. Accordingly, inorganic salts near the roots are ionized by organic acids secreted from the restored rhizosphere microorganisms to be easily absorbed in the crops, thereby reducing the accumulation of salts in the crop cultivation area.

However, when using livestock excrement, organic waste containing organic matter, or plant material, which are raw materials of the organic fertilizer, in their original form, there are problems in storage and difficulties in use, and thus organic fertilizers are used in the form of solidified organic fertilizers. On the other hand, when organic fertilizers are manufactured including microorganisms, in general, microorganisms may be included by being introduced to carriers such as rice straw, crushed wood, or natural minerals. However, when microorganisms are included in the form of a carrier, the fermentation speed of the organism may be reduced or it may be difficult to accomplish complete fermentation, thereby deteriorating the effect of soil reforming, and deteriorating the effect of promoting crop growth.

Accordingly, there is a demand to develop an organic fertilizer which can easily include microorganisms while providing improved quality and productivity of crops, and a method for manufacturing the same.

DETAILED DESCRIPTION OF INVENTION

Technical Task

In order to solve the problems of the prior art described above, the present invention provides an organic fertilizer with improved mechanical properties and quality, and excellent crop productivity by coating at least a part of the surface of the organic fertilizer including plant and animal materials with liquid microorganisms, and a method for manufacturing the same.

Means for Solving Technical Task

According to an aspect, the present invention provides a microbial coated organic fertilizer, comprising a coating layer formed on at least a part of the surface of an organic fertilizer comprising 60 to 80 parts by weight of castor meal and 1 to 15 parts by weight of rice bran, wherein the coating layer is formed by spraying a microbial culture medium, and drying and cooling the same.

According to an embodiment, the organic fertilizer may further comprise at least one selected from the group consisting of 5 to 30 parts by weight of rapeseed oil meal, 1 to 5 parts by weight of palm oil meal, and 5 to 20 parts by weight of processed poultry manure.

According to an embodiment, the microbial culture medium may be one selected from the group consisting of *Bacillus subtilis* culture medium, *Saccharomyces cerevisiae* culture medium, *Pseudomonas protegens* culture medium, *Aspergillus callestemii* culture medium, *Rhodotorula aurantiaca* culture medium, *Bacillus megaterium* culture medium, *Streptomyces costaricanus* culture medium, *Thermoascus thermophilus* culture medium, and a combination of two or more thereof.

According to an embodiment, the thickness of the coating layer may be 10 to 50 μm.

According to an embodiment, the average particle size of the organic fertilizer may be 1 to 10 mm.

According to an embodiment, the organic fertilizer may be in the form of a pellet or granule.

According to another aspect, the present invention provides a method for manufacturing a microbial coated organic fertilizer, comprising: (a) kneading and crushing 60 to 80 parts by weight of castor meal and 1 to 15 parts by weight of rice bran; (b) molding the mixture of step (a) into a pellet or granule to prepare an organic fertilizer; (c) forming a coating layer by spraying a microbial culture medium on the organic fertilizer; and (d) cooling and drying the product of step (c).

According to an embodiment, the kneading and crushing of step (a) may be performed by further comprising at least one selected from the group consisting of 5 to 30 parts by weight of rapeseed oil meal, 1 to 5 parts by weight of palm oil meal, and 5 to 20 parts by weight of processed poultry manure.

According to an embodiment, step (c) may comprise: introducing the organic fertilizer into a drum-type coating machine; and spraying a microbial culture medium into the coating machine, wherein the organic fertilizer is coated by spraying the microbial culture medium at the same time as rotating the coating machine.

According to an embodiment, the cooling and drying of step (d) may be performed at a temperature of 0 to 10° C.

Effect of Invention

The microbial coated organic fertilizer according to an aspect and a method for manufacturing the same provide a high NPK content, less weeds when applying the fertilizer, and no odor, thereby exhibiting excellent usability. In addition, the organic fertilizer may have improved mechanical properties, storage stability and quality by forming a coating layer with a liquid microbial culture medium.

The effects of an aspect of the present invention are not limited to the above-mentioned effects, and it should be understood that the effects of the present invention include all effects that could be inferred from the configuration of the invention described in the detailed description of the invention or the appended claims.

BRIEF DESCRIPTION OF DRAWINGS

FIG. 1 is a schematic diagram of a method for manufacturing a microbial coated organic fertilizer according to an embodiment of the present specification.

BEST MODE FOR CARRYING OUT THE INVENTION

Hereinafter, an aspect of the present specification will be described with reference to the accompanying drawings. However, the description of the present specification may be implemented in various different forms, and thus is not limited to the embodiments described herein. Also, in order to clearly explain an aspect of the present specification in the drawings, portions that are not related to the present invention are omitted, and like reference numerals are used to refer to like elements throughout the specification.

Throughout the specification, it will be understood that when a portion is referred to as being "connected" to another portion, it can be "directly connected to" the other portion, or "indirectly connected to" the other portion having intervening portions present. Also, when a component "includes" an element, unless there is another opposite description thereto, it should be understood that the component does not exclude another element but may further include another element.

When a range of numerical values is described herein, the value has the precision of the significant figures provided according to the standard rules in chemistry for significant figures, unless a specific range thereof is stated otherwise. For example, 10 includes a range of 5.0 to 14.9 and the number 10.0 includes a range of 9.50 to 10.49.

Microbial Coated Organic Fertilizer

According to an aspect, a microbial coated organic fertilizer, comprising a coating layer formed on at least a part of the surface of an organic fertilizer comprising 60 to 80 parts by weight of castor meal and 1 to 15 parts by weight of rice bran, wherein the coating layer is formed by spraying a microbial culture medium, and drying and cooling the same, is provided.

Conventional organic fertilizers comprise livestock excrement, waste containing organic matter, or plant material as main raw material, but they were used in the form of solid due to problems in storage and difficulties in use. In particular, when livestock excrement, food waste, etc. were used as main raw material, there was the inconvenience of having to go through an artificial decomposition (fermentation) process during the manufacturing process, and a peculiar odor and weeds may occur frequently when applying the fertilizer.

The organic fertilizer according to an aspect of the present specification may comprise 60 to 80 parts by weight of castor meal and 1 to 15 parts by weight of rice bran. In addition, the organic fertilizer may further comprise at least one selected from the group consisting of 5 to 30 parts by weight of rapeseed oil meal, 1 to 5 parts by weight of palm oil meal, and 5 to 20 parts by weight of processed poultry manure according to the condition or variety of the applied soil. As such, compared to the conventional compost, it becomes possible to increase the NPK content by comprising vegetable raw materials such as castor meal, rapeseed oil meal, palm oil meal, rice bran, etc., and increase the content of organic matter by comprising animal raw materials such as processed poultry manure.

The castor meal, rapeseed oil meal, and palm oil meal refer to the by-products left after extracting oil and fat from the raw material seeds. The castor meal is the by-product left after extracting oil from castor fruit, rapeseed oil meal is the by-product left after extracting oil from rape fruit, and palm oil meal is the by-product left after pressing oil from coconuts. The castor meal, rapeseed meal and palm oil meal may comprise nitrogen in a relatively high content compared to animal raw materials.

The content of the castor meal may be, for example, 60 parts by weight, 61 parts by weight, 62 parts by weight, 63 parts by weight, 64 parts by weight, 65 parts by weight, 66 parts by weight, 67 parts by weight, 68 parts by weight, 69 parts by weight, 70 parts by weight, 71 parts by weight, 72 parts by weight, 73 parts by weight, 74 parts by weight, 75 parts by weight, 76 parts by weight, 77 parts by weight, 78 parts by weight, 79 parts by weight or 80 parts by weight, but is not limited thereto. When the content of castor meal deviates from the above range, the nitrogen content in the fertilizer may decrease.

The content of the rapeseed oil meal may be, for example, 5 parts by weight, 6 parts by weight, 7 parts by weight, 8 parts by weight, 9 parts by weight, 10 parts by weight, 11 parts by weight, 12 parts by weight, 13 parts by weight, 14 parts by weight, 15 parts by weight, 16 parts by weight, 17 parts by weight, 18 parts by weight, 19 parts by weight, 20 parts by weight, 21 parts by weight, 22 parts by weight, 23 parts by weight, 24 parts by weight, 25 parts by weight, 26 parts by weight, 27 parts by weight, 28 parts by weight, 29 parts by weight or 30 parts by weight, but is not limited thereto. The content of the palm oil meal may be, for example, 1 part by weight, 2 parts by weight, 3 parts by weight, 4 parts by weight or 5 parts by weight, but is not limited thereto.

In the case of further comprising rapeseed oil meal or palm oil meal, when rapeseed oil meal or palm oil meal is introduced in an amount deviating from the above range, the coating property of the fertilizer may deteriorate.

The organic fertilizer may further comprise processed poultry manure. In general, poultry manure has a higher content of fertilizer components such as nitrogen, phosphoric acid, and potassium than cow manure and pig manure, and thus is a valuable raw material for fertilizers. Also, since fertilizer components are generally the same, there is no big difference in the components of poultry manure. However, since the raw material itself has a lot of moisture, in general, in order to be applied as a fertilizer, poultry manure goes through a fermentation process or a drying process to be applied as an organic fertilizer. It may be manufactured in the form of dry poultry manure where the poultry manure is dried, processed poultry manure which goes through a fermentation process for a certain period of time, and decomposed manure which is decomposed completely after going through a fermentation process. In particular, since processed poultry manure goes through a fermentation process for a certain period of time, it may be more stable for crop growth compared to dry poultry manure, and since the fermentation period is shorter than decomposed manure, less nutrients are lost.

The processed poultry manure may be manufactured by mixing sawdust with poultry manure and going through a fermentation process, and poultry manure and sawdust may be mixed in a weight ratio of 70 to 90:10 to 30. By mixing sawdust with the poultry manure, the moisture of the poultry manure may be controlled and the odor may be reduced, so that it can be easily handled, and applied to organic fertilizers. The processed poultry manure may be blended with the above-described vegetable raw materials such as castor meal, rapeseed oil meal and palm oil meal to improve the performance of the organic fertilizer, thereby improving the productivity of crops.

The content of the processed poultry manure may be, for example, 5 parts by weight, 6 parts by weight, 7 parts by weight, 8 parts by weight, 9 parts by weight, 10 parts by weight, 11 parts by weight, 12 parts by weight, 13 parts by weight, 14 parts by weight, 15 parts by weight, 16 parts by weight, 17 parts by weight, 18 parts by weight, 19 parts by weight or 20 parts by weight, but is not limited thereto.

The rice bran is a by-product generated when milling brown rice into white rice, and has a high phosphoric acid content, so it may be used as feed, compost, or eco-friendly material. Since the rice bran comprises an oil component, it can serve as a lubricant allowing each raw material of the organic fertilizer to be mixed evenly when mixed. By evenly mixing each raw material, the bonding force between the raw materials may be improved. The content of the rice bran may be, for example, 1 part by weight, 2 parts by weight, 3 parts by weight, 4 parts by weight, 5 parts by weight, 6 parts by weight, 7 parts by weight, 8 parts by weight, 9 parts by weight, 10 parts by weight, 11 parts by weight, 12 parts by weight, 13 parts by weight, 14 parts by weight, or 15 parts by weight, but is not limited thereto. When the content of rice bran deviates from the above range, the effect as a lubricant as described above may be insufficient, or it may be difficult to solidify the fertilizer.

The microbial coated organic fertilizer may comprise a coating layer formed on at least a part of the surface of the organic fertilizer, and the coating layer may be formed by spraying a microbial culture medium, and drying and cooling the same.

The coating layer may be formed by rotating the organic fertilizer in the presence of microbial powder, or by impregnating the organic fertilizer in a microbial culture medium. However, by using a method of spraying, drying and cooling, the properties of organic fertilizers and the properties of microbial fertilizers may be expressed simultaneously and mechanical strength may be increased to improve storage stability.

As for organic fertilizers manufactured with organic components such as oil meal, processed poultry manure, and rice bran as the main raw material, although the components are not components which have already been fermented or require artificial fermentation, they may supply nutrients to the soil by going through a fermentation process with the microorganisms in the soil after being applied to the soil. However, the fermentation rate may be slower than that of livestock manure compost, and when microorganisms are not smoothly supplied as the soil becomes devastated, the soil reforming effect of organic fertilizers may be reduced remarkably.

The coating layer may be formed on at least a part of the surface of the organic fertilizer, and very little or no microorganisms may be penetrated into the center of the organic fertilizer. The microorganisms included in the coating layer are applied in a liquid phase, so that a certain amount may be absorbed into the surface part, which is a point exceeding 75% from the center (0%) of the organic fertilizer during coating, and the bonding force between the materials of the organic fertilizer is strengthened, so that the mechanical properties of the microbial coated organic fertilizer may be improved. Also, the rice bran of the organic fertilizer may strengthen the bonding force with the coating layer. On the other hand, when the microbial culture medium penetrates into the center, which is a point 75% or less from the center of the organic fertilizer, the microbial coated organic fertilizer may be damaged during the drying and cooling process. Unlike conventional chemical fertilizers, organic fertilizers may have relatively insufficient bonding force, but the mechanical strength and storage stability may be improved by forming a coating layer only on the surface part.

The microbial culture medium may be one selected from the group consisting of *Bacillus subtilis* culture medium, *Saccharomyces cerevisiae* culture medium, *Pseudomonas protegens* culture medium, *Aspergillus* callestemii culture medium, *Rhodotorula aurantiaca* culture medium, *Bacillus megaterium* culture medium, *Streptomyces costaricanus* culture medium, *Thermoascus thermophilus* culture medium, and a combination of two or more thereof. The microbial culture medium may be a 300 to 500 fold dilution of microbial powder of $1 \times 10^{6-7}$ cfu/g in purified water, but is not limited thereto.

The thickness of the coating layer may be 10 to 50 μm, for example, 10 μm, 11 μm, 12 μm, 13 μm, 14 μm, 15 μm, 16 μm, 17 μm, 18 μm, 19 μm, 20 μm, 21 μm, 22 μm, 23 μm, 24 μm, 25 μm, 26 μm, 27 μm, 28 μm, 29 μm, 30 μm, 31 μm, 32 μm, 33 μm, 34 μm, 35 μm, 36 μm, 37 μm, 38 μm, 39 μm, 40 μm, 41 μm, 42 m, 43 μm, 44 μm, 45 μm, 46 μm, 47 m, 48 μm, 49 μm or 50 μm, but is not limited thereto. When the thickness of the coating layer is less than 10 μm, the quality of the organic fertilizer may deteriorate or the effect of improving mechanical strength may be insufficient. Also, when it is more than 50 μm, an excessive coating layer is formed, causing the fermentation rate of the organic fertilizer to deteriorate, or the culture medium penetrates the inside excessively, causing mechanical properties to deteriorate.

The average particle size of the organic fertilizer may be 1 to 10 mm, for example, 1 mm, 2 mm, 3 mm, 4 mm, 5 mm, 6 mm, 7 mm, 8 mm, 9 mm or 10 mm, but is not limited thereto. When the average particle size of the organic fertilizer is less than 1 mm, the risk of loss of the organic fertilizer may increase, and when it is more than 10 mm, mechanical properties of the organic fertilizer may deteriorate.

The organic fertilizer may be in the form of a pellet or granule. Specifically, the organic fertilizer may be manufactured as solid particles of a pellet or granule, so as to minimize the generation of dust while transporting the fertilizer and distribute the fertilizer uniformly when applying the fertilizer, thereby improving convenience of use.

Method for Manufacturing Microbial Coated Organic Fertilizer

FIG. 1 is a schematic diagram of a method for manufacturing an organic fertilizer according to an embodiment.

Referring to FIG. 1, a method for manufacturing a microbial coated organic fertilizer, comprising: (a) kneading and crushing 60 to 80 parts by weight of castor meal and 1 to 15 parts by weight of rice bran; (b) molding the mixture of step (a) into a pellet or granule to prepare an organic fertilizer; (c) forming a coating layer by spraying a microbial culture medium on the organic fertilizer; and (d) cooling and drying the product of step (c), is provided.

First, in step (a), a mixture may be prepared by kneading and crushing 60 to 80 parts by weight of castor meal and 1 to 15 parts by weight of rice bran, or by kneading and crushing by further comprising at least one selected from the group consisting of 5 to 30 parts by weight of rapeseed oil meal, 1 to 5 parts by weight of palm oil meal and 5 to 20 parts by weight of processed poultry manure in addition to the above. Physical properties, contents, and specific effects thereof for each of the raw materials are the same as described above.

The mixture of step (a) may be molded into a pellet or granule in step (b) to prepare an organic fertilizer. Specifically, the mixture of step (a) may be introduced into a molding machine and molded by being solidified in the form of a pellet or granule. In step (b), the molding temperature of the organic fertilizer may be between 300 to 500° C., for example, 300° C., 325° C., 350° C., 375° C., 400° C., 425° C., 450° C., 475° C., 500° C., or a temperature between any of the two values. When the molding temperature is less than 300° C., the moldability of the organic fertilizer may deteriorate, and when it more than 500° C., the molding temperature may be excessively high and the organic fertilizer may be destroyed.

In step (c), a coating layer may be formed by spraying a microbial culture medium on the organic fertilizer. Specifically, step (c) comprises: introducing the organic fertilizer molded in step (b) into a drum-type coating machine; and spraying a microbial culture medium into the coating machine. The organic fertilizer may be coated by spraying the microbial culture medium at the same time as rotating the coating machine. Accordingly, a coating layer may be uniformly formed on the surface of the organic fertilizer. Since the coating layer comprises a microbial culture medium, part of the microbial culture medium may be absorbed into the organic fertilizer to strongly increase the bonding force of the organic fertilizer, and thus the mechanical properties of the organic fertilizer may be improved.

Also, since the microbial culture medium is directly coated on the organic fertilizer, the fermentation rate of the organic fertilizer may be improved, thereby improving the productivity of crops. In addition, since the coating layer is formed by rotary spraying, it is possible to prevent excessive penetration of the culture medium and improve mechanical properties and storage stability.

The drum-type coating machine may control the rotation speed of the drum and the amount of culture medium sprayed according to the characteristics of the organic fertilizer and the thickness of the coating layer to be formed. For example, the rotation speed of the drum may be 5 to 25 rpm, and the amount of culture medium sprayed may be 0.1 to 20 parts by volume with respect to 100 parts by volume of organic fertilizer. When the rotation speed of the drum increases or the amount of culture medium sprayed decreases, the thickness of the coating layer may decrease, and when the rotation speed of the drum decreases or the amount of culture medium sprayed increases, the thickness of the coating layer may increase.

In step (d), the product of step (c) may be cooled and dried. The cooling and drying of step (d) may be performed at a temperature of 0 to 10° C. When the cooling and drying temperature satisfies the above range, it is possible to prevent the problems of degradation of mechanical properties or decrease in bonding force between the organic fertilizer and coating layer caused by excessive cooling and drying.

The thickness of the coating layer may be 10-50 μm, for example, 10 μm, 11 μm, 12 μm, 13 μm, 14 μm, 15 μm, 165 μm, 17 μm, 18 μm, 19 μm, 20 μm, 21 μm, 22 μm, 23 μm, 24 μm, 25 μm, 26 μm, 27 μm, 28 μm, 29 μm, 30 μm, 31 μm, 32 μm, 33 μm, 34 μm, 35 μm, 36 μm, 37 μm, 38 μm, 39 μm, 40 μm, 41 μm, 42 μm, 43 μm, 44 μm, 45 μm, 46 μm, 47 μm, 48 μm, 49 μm or 50 μm, but is not limited thereto. When the thickness of the coating layer is less than 10 μm, the quality and mechanical properties of the organic fertilizer may deteriorate. Also, when it is more than 50 μm, an excessive coating layer is formed, thereby reducing the fermentation rate of the organic fertilizer.

The average particle size of the organic fertilizer may be 1 to 10 mm, for example, 1 mm, 2 mm, 3 mm, 4 mm, 5 mm, 6 mm, 7 mm, 8 mm, 9 mm or 10 mm, but is not limited thereto. When the average particle size of the organic fertilizer is less than 1 mm, the risk of loss of the organic fertilizer may increase, and when it is more than 10 mm, mechanical properties of the organic fertilizer may deteriorate.

Hereinafter, embodiments of the present specification will be described in more detail. However, the following experimental results describe only representative experimental results among the above examples, and the scope and content of the present specification may not be construed as reduced or limited by the examples. Each effect of the various embodiments of the present specification not explicitly presented below will be specifically described in the corresponding section.

Example 1

80 parts by weight of castor meal, 10 parts by weight of rapeseed oil meal, 5 parts by weight of palm oil meal, and 5 parts by weight of rice bran were introduced into a crusher, and kneaded and crushed to prepare a mixture.

The prepared mixture was introduced into a granular molding machine and extruded at 400° C. to mold an organic fertilizer in the form of a pellet. The molded organic fertilizer was introduced into a drum-type coating machine, and the surface of the organic fertilizer was coated in a thickness of 30 µm by spraying a *Bacillus megaterium* culture medium at the same time as rotating the coating machine. Then, the product was cooled and dried in a cooler at a temperature of 5° C. for 2 hours to prepare a microbial coated organic fertilizer having an average particle size of 5 mm.

Example 2

70 parts by weight of castor meal, 20 parts by weight of processed poultry manure having poultry manure and sawdust mixed in a weight ratio of 80:20, and 10 parts by weight of rice bran were introduced into a crusher, and kneaded and crushed to prepare a mixture.

The prepared mixture was introduced into a granular molding machine and extruded at 400° C. to mold an organic fertilizer in the form of a granule. The molded organic fertilizer was introduced into a drum-type coating machine, and the surface of the organic fertilizer was coated in a thickness of 30 µm by spraying a *Bacillus megaterium* culture medium at the same time as rotating the coating machine. Then, the product was cooled and dried in a cooler at a temperature of 5° C. for 2 hours to prepare a microbial coated organic fertilizer having an average particle size of 5 mm.

Example 3

60 parts by weight of castor meal, 30 parts by weight of rapeseed oil meal, and 10 parts by weight of rice bran were introduced into a crusher, and kneaded and crushed to prepare a mixture.

The prepared mixture was introduced into a granular molding machine and extruded at 400° C. to mold an organic fertilizer in the form of a granule. The molded organic fertilizer was introduced into a drum-type coating machine, and the surface of the organic fertilizer was coated in a thickness of 30 µm by spraying a *Bacillus megaterium* culture medium at the same time as rotating the coating machine. Then, the product was cooled and dried in the cooler at a temperature of 5° C. for 2 hours to prepare a microbial coated organic fertilizer having an average particle size of 5 mm.

Example 4

A microbial coated organic fertilizer was prepared in the same manner as in Example 1, except that the coating layer was coated to have a thickness of 15 µm by increasing the drum rotation speed and decreasing the amount of culture medium sprayed.

Example 5

A microbial coated organic fertilizer was prepared in the same manner as in Example 1, except that the coating layer was coated to have a thickness of 45 µm by increasing the amount of the culture medium sprayed.

Comparative Example 1

The conventional organic fertilizer manufactured with the excrement of livestock was used as Comparative Example 1.

Comparative Example 2

An organic fertilizer was prepared in the same manner as in Example 1, except that a coating layer comprising a microbial culture medium was not formed.

Comparative Example 3

A microbial coated organic fertilizer was prepared in the same manner as in Example 1, except that the coating layer was formed by rotary stirring the molded organic fertilizer with microbial powder. It was impossible to measure the thickness of the coating layer because the microbial powder was not uniformly coated on the organic fertilizer.

Comparative Example 4

A microbial coated organic fertilizer was prepared in the same manner as in Example 1, except that the coating layer was formed by impregnating the molded organic fertilizer in a microbial culture medium for 30 seconds, and then cooling and drying the same. The coating layer was formed to have a thickness of about 80 µm, and the microbial culture medium penetrates into the molded organic fertilizer, so that the rate of microbial coated organic fertilizer destroyed during cooling and drying exceeds 30%, resulting in a poor yield.

Comparative Example 5

An organic fertilizer was prepared in the same manner as in Example 1, except that the coating layer was coated to have a thickness of 5 µm by increasing the drum rotation speed and decreasing the amount of culture medium sprayed.

Comparative Example 6

An organic fertilizer was prepared in the same manner as in Example 1, except that the coating layer was coated to have a thickness of 75 µm by increasing the amount of microbial culture medium sprayed. The microbial culture medium penetrated into the molded organic fertilizer, so that part of the microbial coated organic fertilizer was destroyed during cooling and drying. From the fact that the microbial coated organic fertilizer was damaged causing a loss of 15% in diameter, it is expected that the amount of damage will increase when the microbial culture medium penetrates excessively.

Experimental Example 1: Evaluation of Components of Organic Fertilizer

In order to evaluate the components of the organic fertilizer manufactured in the Examples and Comparative Examples, the pH and contents of OM (organic matter), T-N (total nitrogen), $P_2O_5$ (phosphorus), $K_2O$ (potassium), CaO (calcium), MgO (magnesium), $Na_2O$ (sodium) and moisture content were measured for each organic fertilizer, and the results are shown in Table 1.

TABLE 1

|  | pH | OM (%) | T-N (%) | P$_2$O$_5$ (%) | K$_2$O (%) | CaO (%) | MgO (%) | Na$_2$O (%) | Moisture (%) |
|---|---|---|---|---|---|---|---|---|---|
| Example 1 | 6.4 | 76.4 | 7.7 | 2.4 | 2.1 | 5.8 | 0.9 | 0.2 | 4.5 |
| Example 2 | 6.5 | 76.2 | 7.6 | 2.4 | 1.9 | 5.7 | 1.1 | 0.3 | 4.8 |
| Example 3 | 6.4 | 76.3 | 7.7 | 2.5 | 2.0 | 5.6 | 1.0 | 0.2 | 4.7 |
| Comparative Example 1 | 6.1 | 45.7 | 4.7 | 1.2 | 0.5 | 3.4 | 0.3 | 1.2 | 43 |
| Comparative Example 2 | 6.2 | 80.3 | 6.2 | 1.5 | 1.1 | 4.5 | 0.5 | 0.2 | 3.7 |
| Comparative Example 3 | 6.4 | 78.9 | 7.1 | 2.0 | 2.0 | 5.2 | 0.7 | 0.3 | 3.8 |
| Comparative Example 4 | 6.2 | 75.9 | 6.8 | 1.6 | 1.2 | 5.4 | 0.6 | 0.2 | 8.3 |

Referring to Table 1, although there was a slight difference in the organic fertilizers except for Comparative Example 1, which is the conventional livestock manure compost, it can be confirmed that organic matters took up 75% or more, and in particular, nitrogen (N), phosphorus (P), and potassium (K), which are the most effective components among the organic fertilizer components in Examples 1 and 2, showed the highest values. Thus, it may be expected that the quality of soil and the productivity of crops may be improved when applying the fertilizer. On the other hand, in the case of not comprising a coating layer (Comparative Example 2), or forming the coating layer by impregnating the organic fertilizer in a culture medium (Comparative Example 4), it was confirmed that the NPK components were somewhat lower in the organic fertilizer.

Experimental Example 2: Evaluation of Mechanical Properties of Organic Fertilizer In order to confirm the mechanical properties of the organic fertilizer manufactured in the Examples and Comparative Examples, the impact strength and tensile strength were measured, and the results are shown in Table 2.

Impact strength (⅛", kg cm/cm): measured according to ASTM D256 method (Notched-Izod Impact).
Tensile strength (kg cm/cm): measured according to ASTM D638 method

TABLE 2

|  | Impact strength | Tensile strength |
|---|---|---|
| Example 1 | 10.4 | 251 |
| Example 2 | 10.2 | 247 |
| Example 3 | 10.3 | 253 |
| Example 4 | 9.8 | 237 |
| Example 5 | 10.1 | 238 |
| Comparative Example 1 | 5.1 | 154 |
| Comparative Example 2 | 7.4 | 174 |
| Comparative Example 3 | 7.2 | 162 |
| Comparative Example 4 | 6.3 | 137 |
| Comparative Example 5 | 7.5 | 177 |
| Comparative Example 6 | 6.8 | 141 |

Referring to Table 2, in view of the impact strength and tensile strength of the microbial coated organic fertilizer in the Examples, it can be confirmed that the mechanical properties are excellent. Thus, the microbial coated organic fertilizer of the Examples may be sprayed without damage or loss when applying the fertilizer. Accordingly, it can be expected to have excellent fermentation rate as compared to using the organic fertilizer, resulting in improved productivity of crops.

On the other hand, in the case of the conventional livestock compost (Comparative Example 1), it can be confirmed that the impact strength and tensile strength deteriorated remarkably by comprising a large amount of moisture. In the case of not comprising a coating layer (Comparative Example 2) or forming a coating layer by using microbial powder (Comparative Example 3), the impact strength and tensile strength were low. In the case of forming a coating layer by impregnating the organic fertilizer in a microbial culture medium (Comparative Example 4), the culture medium excessively penetrated into the microbial coated organic fertilizer, resulting in degradation of the impact strength and tensile strength. Even when coated by spraying a culture medium, in the case the coating layer is excessively thin (Comparative Example 5), the organic fertilizer had reduced bonding force and thus the strength improvement effect was insufficient, and in the case the coating layer is excessively thick (Comparative Example 6), the culture medium penetrated excessively, thereby degrading the mechanical properties.

The foregoing description of the present invention has been presented for illustrative purposes, and it is apparent to a person having ordinary skill in the art that the present invention can be easily modified into other detailed forms without changing the technical idea or essential features of the present invention. Therefore, it should be understood that the forgoing embodiments are by way of example only, and are not intended to limit the present disclosure. For example, each component which has been described as a unitary part can be implemented as distributed parts. Likewise, each component which has been described as distributed parts can also be implemented as a combined part.

The scope of the present invention is presented by the accompanying claims, and it should be understood that all changes or modifications derived from the definitions and scopes of the claims and their equivalents fall within the scope of the present invention.

What is claimed is:

1. A microbial coated organic fertilizer, comprising a coating layer formed on at least a part of the surface of an organic fertilizer comprising 60 to 80 parts by weight of castor meal and 1 to 15 parts by weight of rice bran, wherein the coating layer is formed by spraying a microbial culture medium, and drying and cooling the same at a temperature of 0 to 10° C., and a thickness of the coating layer is 10 to 50 μm.

2. The microbial coated organic fertilizer of claim 1, wherein the organic fertilizer further comprises at least one selected from the group consisting of 5 to 30 parts by weight of rapeseed oil meal, 1 to 5 parts by weight of palm oil meal, and 5 to 20 parts by weight of processed poultry manure.

3. The microbial coated organic fertilizer of claim 1, wherein the microbial culture medium is one selected from the group consisting of *Bacillus subtilis* culture medium, *Saccharomyces cerevisiae* culture medium, *Pseudomonas protegens* culture medium, *Aspergillus* callestemii culture medium, *Rhodotorula aurantiaca* culture medium, *Bacillus megaterium* culture medium, *Streptomyces costaricanus* culture medium, *Thermoascus thermophilus* culture medium, and a combination of two or more thereof.

4. The microbial coated organic fertilizer of claim 1, wherein the average particle size of the organic fertilizer is 1 to 10 mm.

5. The microbial coated organic fertilizer of claim 1, wherein the organic fertilizer is in the form of a pellet or granule.

6. A method for manufacturing a microbial coated organic fertilizer, comprising:
   (a) kneading and crushing 60 to 80 parts by weight of castor meal and 1 to 15 parts by weight of rice bran;
   (b) molding the mixture of step (a) into a pellet or granule to prepare an organic fertilizer;
   (c) forming a coating layer having a thickness of 10 to 50 µm by spraying a microbial culture medium on the organic fertilizer; and
   (d) cooling and drying the product of step (c) at a temperature of 0 to 10° C.

7. The method of claim 6, wherein the kneading and crushing of step (a) are performed by further comprising at least one selected from the group consisting of 5 to 30 parts by weight of rapeseed oil meal, 1 to 5 parts by weight of palm oil meal, and 5 to 20 parts by weight of processed poultry manure.

8. The method of claim 6, wherein step (c) comprises:
   introducing the organic fertilizer into a drum-type coating machine; and
   spraying a microbial culture medium into the coating machine,
   wherein the organic fertilizer is coated by spraying the microbial culture medium at the same time as rotating the coating machine.

\* \* \* \* \*